US009950917B2

(12) United States Patent
Chapman et al.

(10) Patent No.: US 9,950,917 B2
(45) Date of Patent: Apr. 24, 2018

(54) BEVERAGE PRESERVATION AND DISPENSING DEVICE

(71) Applicants: Brian A. Chapman, Indianapolis, IN (US); David Hufford, Indianapolis, IN (US)

(72) Inventors: Brian A. Chapman, Indianapolis, IN (US); David Hufford, Indianapolis, IN (US)

( * ) Notice: Subject to any disclaimer, the term of this patent is extended or adjusted under 35 U.S.C. 154(b) by 14 days.

(21) Appl. No.: 15/071,822

(22) Filed: Mar. 16, 2016

(65) Prior Publication Data

US 2017/0267510 A1 Sep. 21, 2017

(51) Int. Cl.

| | |
|---|---|
| ***G01F 11/20*** | (2006.01) |
| ***B67D 1/04*** | (2006.01) |
| ***B67D 1/08*** | (2006.01) |
| ***B67D 1/14*** | (2006.01) |

(52) U.S. Cl.

CPC ......... *B67D 1/0418* (2013.01); *B67D 1/0801* (2013.01); *B67D 1/1438* (2013.01); *B67D 1/1477* (2013.01); *B67D 2001/0812* (2013.01)

(58) Field of Classification Search

CPC .. B67D 1/0418; B67D 1/0801; B67D 1/1438; B67D 1/1477; B67D 2001/0812

USPC .......................................................... 222/399

See application file for complete search history.

(56) References Cited

U.S. PATENT DOCUMENTS 1,920,165 A * 8/1933 Andvig .................. A61M 11/02 222/399
2,189,643 A * 2/1940 Ward ................... B67D 1/0412 137/212
2,388,026 A * 10/1945 Ward ................... B67D 1/0425 137/630.22
2,705,578 A * 4/1955 Burns .................. B67D 1/0418 141/17
3,272,404 A * 9/1966 Graves ................. B67D 1/0412 137/212
3,308,990 A * 3/1967 Klasson ............... B67D 1/0412 137/212
3,327,899 A * 6/1967 Reynolds ............. B67D 1/0412 222/396
3,373,907 A * 3/1968 Batrow ................ B67D 1/0412 137/212
3,556,356 A * 1/1971 Mockesch ............ B67D 1/0412 222/1
3,612,354 A * 10/1971 Sitton .................. B67D 1/1466 137/614.19
3,927,801 A * 12/1975 Martin ................. B67D 1/0412 138/40

(Continued)

*Primary Examiner* — Patrick M Buechner
*Assistant Examiner* — Michael J Melaragno
(74) *Attorney, Agent, or Firm* — Woodard, Emhardt, Moriarty, McNett & Henry LLP

(57) ABSTRACT

There is shown a dispensing apparatus for use with pressurized containers of fluids, particularly carbonated beverages such as beer. A base that fits onto the container has a piston member slidably fitted to it, along with a compressed gas housing and a pickup tube or assembly. A handle moves the piston member with respect to the base against a spring bias. A gas flow path from the housing to the container passes through a valve, that is opened by the piston member as the handle is moved. Moving the handle opens both a liquid flow path as well as a gas flow path.

20 Claims, 7 Drawing Sheets

(56) References Cited

U.S. PATENT DOCUMENTS

| | | | | | |
|---|---|---|---|---|---|
| 3,976,221 | A * | 8/1976 | Martin | B67D 1/0412 | 138/40 |
| 4,094,335 | A | 6/1978 | Haensch | | |
| 4,993,601 | A * | 2/1991 | Nakayama | B67D 1/0021 | 222/129.1 |
| 5,022,565 | A * | 6/1991 | Sturman | B67D 1/0412 | 222/396 |
| 5,090,599 | A | 2/1992 | Stenger | | |
| 5,240,144 | A | 8/1993 | Feldman | | |
| 5,248,062 | A * | 9/1993 | Hillard | B67D 1/0412 | 222/396 |
| 5,443,186 | A * | 8/1995 | Grill | B67D 1/0412 | 137/505.11 |
| 5,458,165 | A * | 10/1995 | Liebmann, Jr. | B65B 31/04 | 141/19 |
| 5,617,977 | A | 4/1997 | Augustinus | | |
| 5,667,110 | A | 9/1997 | McCann et al. | | |
| 5,862,961 | A | 1/1999 | Motta et al. | | |
| 5,979,713 | A * | 11/1999 | Grill | B67D 1/0412 | 222/399 |
| 6,073,811 | A | 6/2000 | Costea | | |
| 6,536,632 | B2 | 3/2003 | Bilskie et al. | | |
| 7,533,788 | B2 | 5/2009 | Harvey et al. | | |
| 7,712,631 | B2 | 5/2010 | Taradalsky et al. | | |
| 8,056,773 | B2 | 11/2011 | Klaauw et al. | | |
| 8,079,500 | B2 | 12/2011 | Copplestone-Bruce | | |
| 8,225,959 | B2 | 7/2012 | Lambrecht | | |
| 8,302,822 | B2 * | 11/2012 | Kranz | B67D 1/12 | 137/505.36 |
| 8,887,959 | B2 | 11/2014 | Hill et al. | | |
| 9,156,670 | B2 | 10/2015 | Hill et al. | | |
| 9,352,949 | B2 | 5/2016 | Rege et al. | | |
| 2001/0010316 | A1 * | 8/2001 | Parsons | B67D 7/0238 | 222/52 |
| 2008/0217361 | A1 * | 9/2008 | Vitantonio | B67D 1/0418 | 222/399 |
| 2008/0217362 | A1 * | 9/2008 | Vitantonio | B67D 1/0418 | 222/399 |
| 2008/0217363 | A1 * | 9/2008 | Vitantonio | B67D 1/0418 | 222/399 |
| 2009/0101680 | A1 * | 4/2009 | Laws | B01F 15/0205 | 222/399 |
| 2009/0283540 | A1 * | 11/2009 | Kelly | B67D 1/0418 | 222/1 |
| 2009/0283553 | A1 * | 11/2009 | Hoss | B67D 1/0418 | 222/396 |
| 2011/0147406 | A1 * | 6/2011 | Grill | B67D 1/0418 | 222/1 |
| 2016/0068380 | A1 | 3/2016 | Rege et al. | | |

* cited by examiner

BEVERAGE PRESERVATION AND DISPENSING DEVICE

The present disclosure generally concerns dispensing devices, particularly for dispensing liquids (e.g. beverages) from a container.

BACKGROUND

It is well known to package beverages in sealed containers for the consumer to take from a store, restaurant or other location for home consumption. So long as the container and its seal remains intact, the container keeps in carbonation and keeps out agents that can unfavorably change the characteristics of the beverage, including air (with associated dust or pathogens) or radiation. For example, a carbonated beverage such as soda or beer can be maintained for substantial periods in sealed containers like cans or bottles, and when opened for the first time, enjoyed with the fizz of the carbonation. Once opened, however, the beverage should be consumed relatively quickly, before the carbonation dissipates and/or before oxygen or other outside agents can affect the beverage. An open can or cup of a carbonated beverage can become "flat"—lose its carbonation—quickly, perhaps within an hour or less. Such a flat beverage generally has less appeal, and may include a significant deterioration in flavor with loss of carbonation and/or exposure to oxygen or other environmental factors. Of course, non-carbonated beverages exposed to air over time can also experience deterioration in quality.

Where the sealed container is small, for example a one-serving or 12-ounce or 330 milliliter can or bottle, the consumer can open it and easily finish the beverage before any significant taste or other quality changes can occur. However, for reasons of economy, beverages are frequently sold at retail in larger containers, with the understanding that the consumer can provide a larger volume for gatherings when it is needed, and/or can be used over a period of time. In the United States, two-liter bottles of soft drinks are sold with screw-on caps. Any beverage remaining after the seal is broken can be retained by replacing the cap, which provides an imperfect re-seal. The carbonation in the beverage will be maintained over a matter of days, but if not used in that period the beverage will become flat. Further, beverages maintained in opened but imperfectly resealed containers can be affected by other items in proximity (e.g. items within a refrigerator), potentially changing the flavor or aroma of the beverage.

Another area in which larger containers for beverages are becoming common is in retail beer sales by a variety of establishments, such as small breweries, brew-pubs, or restaurants, or in sales of equipment by home-brew shops. A patron can purchase for take-out a half-gallon bottle or jug (commonly referred to as a "growler") or other large-sized container (quart (e.g. a "bullet"), gallon, five-gallon, half-barrel or barrel, as examples) of the desired beer. In some cases, at a later time the consumer can return with the bottle for refilling. Once the consumer removes the cap or otherwise opens the growler or other container, any seal that was present is broken. While the cap can be replaced to help stave off loss of carbonation and/or changes to the taste of the beer (e.g. due to oxygen from the atmosphere), such changes can occur in a matter of one or two days. In the case of a single consumer wishing to buy a favorite microbrew for his own use, with the economy of a larger bottle or "growler," consumer(s) must thus drink a substantial amount of beer in a day or two, or risk losing palatability of any remaining beer. Naturally, such rapid or over-consumption may not be advisable or possible.

While large tapping systems for kegs are in use, employing forced air, carbon dioxide, nitrogen or a mixture of gases heavier than air to propel beer to a dispensing valve while keeping oxygen away from the beer, an effective system is needed for individual smaller containers such as growlers. The inventors have found that it is commonly assumed that such smaller vessels are used for immediate consumption of the entire contents, and thus preservation over time is not needed. Small batch beer, or craft beer, generally has a higher alcohol content than mass-produced beers, as well as a higher price, creating the possibility or likelihood of not consuming the entire contents in one sitting with the desire not to have wasted money on spoiled remainder. To the extent that dispensing systems for growlers or other smaller containers have been developed, they may be patterned after systems for kegs and as such may be unwieldy or otherwise more difficult to use with smaller containers. Maintenance of proper pressure (e.g. high enough to keep oxygen from seeping in and to force beverage out at a reasonable rate when dispensing is desired, yet below a pressure potentially damaging to the container) can be difficult with some dispensers.

Available dispensing devices also can be difficult to repair or clean. In many cases, once a seal or other part fails, the device must be thrown away and replaced.

There remains a need for a system to maintain a seal and/or positive pressure on beverage bottles or jugs, to allow the consumer to enjoy the benefit of their economy while using the contents in smaller amounts and reducing or eliminating wastage. A system that allows easy cleaning or replacement of parts is also desirable. The current disclosure meets such a need.

SUMMARY

Among other things, there is disclosed a beverage dispenser apparatus or system for attachment to a beverage container having an interior for containing a beverage. Particular embodiments of the apparatus or system include a base having an opening for communicating or interfacing with the interior of the beverage container when attached to the beverage container, and a lateral channel. A piston member is slidably within the lateral channel, the piston member having a spout portion outside of the channel and a conduit extending through a wall of the piston member and out of the spout portion whereby beverage from within the container may pass through the conduit and exit from the spout portion. A handle is pivotally attached to the base, and connected to the piston member so that as the handle is pivoted toward the base, the piston member is forced through the lateral channel of the base. A compressed gas housing attached to the base has an inner cavity. A flow path extends from the cavity of the compressed gas housing through the base to the opening, the flow path having multiple constricting points. A first constricting point may include a restrictor plug and/or a chamber (for example, a restrictor plug at least partially within a chamber), and a second constricting point may include a valve.

Specific embodiments may have a third constricting point including a conduit from the lateral channel to the bottom opening, the conduit being narrower than the plug and/or chamber of the first constricting point. The lateral channel may be non-parallel with the restrictor plug. The piston member in particular embodiments includes a spout portion and an opposite end with an end opening facing the valve, and a spring engaging the piston member within the end opening and engaging a sleeve holding the valve. The piston member may include a threaded gap communicating with the end opening and the valve includes a pin biased to a closed position, and further include a screw threaded in the gap, the screw contacting the pin at a point when the handle is pivoted a predetermined amount toward the base, whereby the screw moves the pin to open the valve. The apparatus may have a first idle configuration and a second dispensing configuration, and in the first configuration the handle is positioned with respect to the compressed gas housing so that an adult can grasp the compressed gas housing and the handle at the same time with a single hand. The second configuration can be attained by pivoting the handle toward the compressed gas housing. Embodiments of the compressed gas housing can include a compressed gas tube having an outlet and a cap, and wherein in operation the outlet of the compressed gas tube faces the cap. A feed tube, which may include or be connected to a check valve, may be removably fixed to the base and extend through the opening to extend into the beverage container.

Also described below are embodiments of a system for dispensing beverage under pressure from a container that include a base for attachment to the container, the base having a gas flow path including a valve. A piston member is slidably within the base, having a spout portion extending away from the base and a fluid flow channel. A handle is pivotally attached to the base, wherein the handle can engage the piston member to move the piston member into the base and toward the valve. A compressed gas housing is attached to the base, and a pickup assembly extends from the body, for extending into the container. As an example, moving the piston member into the base a desired amount causes a portion of the piston member to engage a portion of the valve to open the valve and allow gas to move through the valve.

These and other embodiments are described in greater detail below and in the accompanying drawings. Preservation of the beverage by maintaining carbon dioxide or other appropriate gas in the head space over it to keep oxygen from "touching" it is accomplished by the illustrated embodiment, with easy dispensing via an ergonomic configuration.

DESCRIPTION OF THE ILLUSTRATED EMBODIMENTS

Figure 1:
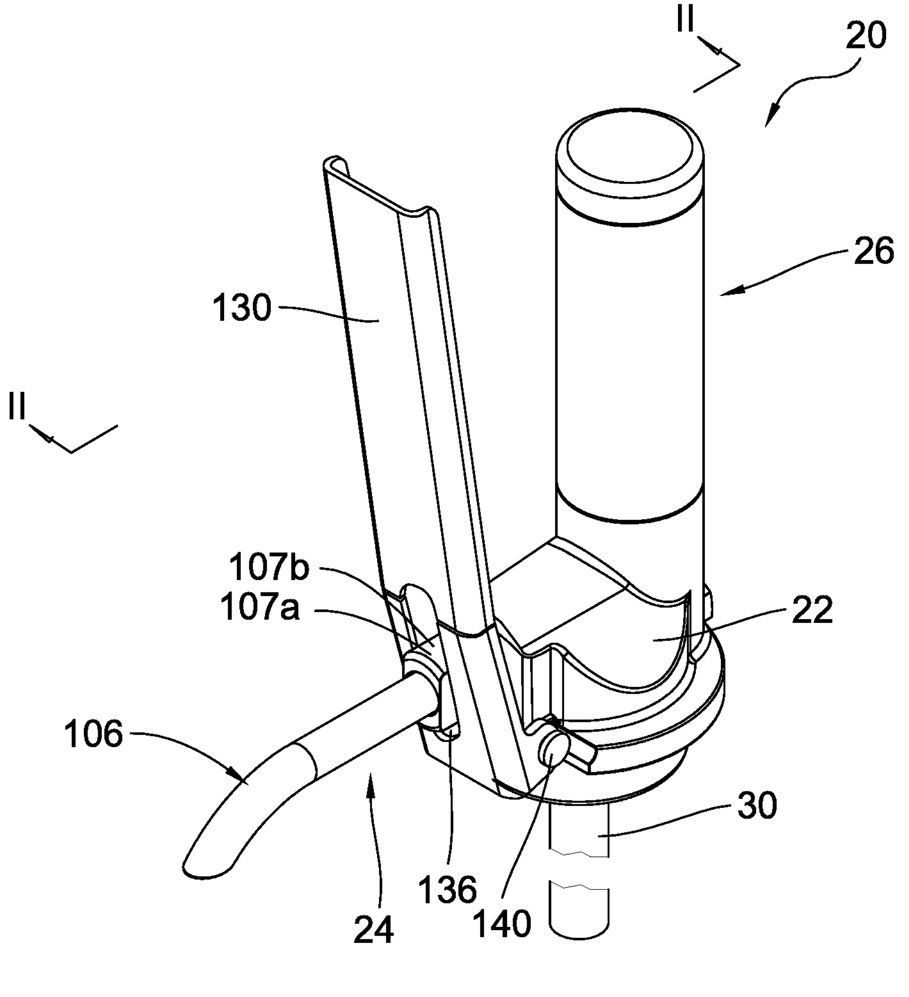
FIG. 1 is a perspective view of an embodiment of a system or apparatus for dispensing liquids such as carbonated beverages.

For the purposes of promoting an understanding of the principles of the disclosure, reference will now be made to the embodiments illustrated in the drawings and specific language will be used to describe the same. It will nevertheless be understood that no limitation of the scope of the claims is thereby intended, and alterations and modifications in the illustrated devices and methods, and further applications of the principles of the disclosure as illustrated therein are herein contemplated as would normally occur to one skilled in the art to which the disclosure relates.

Referring now generally to the drawings, there is shown a beverage dispenser apparatus or system 20 in an embodiment usable with commonly-available growlers or other containers having an externally threaded mouth or other opening, for maintaining freshness and quality of the contents over time. The growler is a representative example of suitable containers with which examples of system 20 can be used, and a similar system may be used with other bottles or containers. As used herein, "container" should be understood to refer to any of a variety of bottles, jugs, receptacles, vessels or other holders for a quantity of beverage for later pouring or dispensing, including but not limited to growlers. As is well-known, such growlers are generally in the form of a jug, having a main containing volume narrowing to an upper neck that has an externally threaded opening, and in some cases has a small handle or finger-hold on the side of the neck. System 20 in this embodiment is designed to thread onto the neck over the opening, with a portion extending into the main volume V so that the user can obtain beer or other contents without exposing the contents to the outside air.

The illustrated embodiment of system 20 includes a base or main body 22 for attachment to the growler or other container. Connected to main body 22 are a piston member or assembly 24, a housing 26 for a compressed gas source (e.g. a cartridge), and a pickup tube or assembly 30.

Base 22 is a rigid or sturdy generally round block in the illustrated embodiment. Curved or arched (e.g. cylindrical) side walls 34 and upper surface 36 provide accommodating surfaces and smoothness during use, as will be discussed further below. A lower collar 38 surrounds an opening 40 and extends from a flange 42. Collar 38 is smaller in diameter than the width of side walls 36 in this embodiment, and opening 40 is sized to fit over the top opening of a growler to form a seal, as will be further discussed below. In this example, opening 40 is internally threaded so as to be screwed onto external threads on the neck of a growler. In particular embodiments, body 22 is formed as a single piece, as by casting, molding or machining, so that its walls 34, surface 36, collar 38 and flange 42 are monolithic.

Base 22 in the illustrated embodiment includes a portion for connection of a compressed gas source, exemplified in the drawings as a collar or socket 43 for accommodating housing 26, which is circular and internally threaded in the illustrated embodiment. Collar 43 provides for a stable, rigid and easy placement of housing 26. Collar 43 has a stepped wall in the illustrated embodiment, having an upper section of relatively larger diameter and a lower section of relatively smaller diameter with a ledge or boss between them. An opening 46 is in a floor surface 47 within the perimeter of collar 43 and extends into base 22, forming a part of a flow path for compressed gas through base 22, as will be discussed further below. The particular example shows opening 46 in a rear portion of base 22, e.g. opposite the spout end of piston member 24 and adjacent to part of the wall of collar 43. Opening 46 is generally cylindrical from floor surface 47, narrowing at a far end within base 22 to a very narrow hole (e.g. one-quarter or less of the diameter of opening 46) that opens into a lateral channel described below. A restrictor plug 48 sits in opening 46. In one example, plug 48 is generally in the form of a cylinder with a beveled forward end 50, and is firmly fitted (e.g. with a press-fit) in opening 46. The outer surface 52 of plug 48 is a smooth generally cylindrical surface having an outer diameter that is substantially the same as the inner diameter of opening 46. A longitudinal linear groove 54 is in outer surface 52, extending from one end of plug 48 to the other. Groove 54 in a particular embodiment is a cylindrical groove having a maximum depth of 0.0075 inches and a width at outer surface 52 of 0.0150 inches. Groove 54 provides a part of the flow path for compressed gas, allowing gas to move from housing 26 in a restricted manner through opening 46.

A lateral and linear channel or cavity 60 is within base 22 from an opening 61 in a front wall to an end inside base 22. Channel 60 is substantially cylindrical in this embodiment, having a forward portion that accommodates piston member 24, which has a close but slidable fit within that portion of channel 60 so that piston member 24 can move forward and backward within base 22. A rearward portion of channel 60 has a smaller inner diameter than the forward portion of channel 60 for accommodating valve assembly 66, as will be discussed further below. That rearward portion of channel 60 communicates with opening 46 via the narrow hole at the bottom of opening 46, described previously. A ledge or boss 67 narrows channel 60 from the forward, larger-diameter portion to the rearward, smaller-diameter portion. It will be understood that other shapes of cavity 60 may be used, so long as piston member 24 can slide within it.

Valve assembly 66 in the illustrated embodiment includes a valve 68 within a holding sleeve or body 70, and may include a washer 72 to seal between sleeve 70 and boss 67. Valve 68 is a poppet valve (e.g. a Schrader valve) in a particular example, having a pin 73 that is biased to close the valve, and when pin 73 is pressed into the body of the valve, flow through the valve is allowed. Sleeve 70 includes an inner lumen 74 and an outer flange 76. Lumen 74 has a larger-diameter forward section, a narrowing conical middle, and a smaller-diameter rearward section as illustrated. The outer diameter of this embodiment of sleeve 70 is larger rearward of flange 76 than its outer diameter forward of flange 76. Valve 68 fits in lumen 74 with its pin 73 extending from the forward end of lumen 74 and sleeve 70. In particular embodiments, valve 68 has a flush or interference engagement with a portion of the wall surrounding lumen 74, e.g. at or along the narrowing middle of lumen 74. An extension 75 fits around the end of valve 68 opposite pin 73 and extends from the rearward end of sleeve 70, to allow space around sleeve 70 and valve 68 in the smaller-diameter portion of channel 60 of base 22. The rearward portion of sleeve 70 is inserted into the smaller-diameter portion of channel 60 with a secure (e.g. threaded) or interference fit, so that valve assembly 66 is securely attached within channel 60 with pin 73 of valve 68 pointing forward, i.e. toward opening 61 of channel 60. Washer 72 is between flange 76 of sleeve 70 and boss 67 in channel 60. A spring 78 fits around the forward portion of sleeve 70 and engages flange 76 of valve assembly 66. As will be discussed further below, spring 78 biases piston member 24 to a forward position.

Collar 38 extends below or from flange 42 in this embodiment, and includes internal threads 82 compatible with threads around the neck of a beverage container. Opening 40 is a lower opening in this embodiment, which has an end surface 84 adjacent channel 60. A groove or pocket in or around end surface 84, and/or above or within threads 82, accommodates a seal 86 (shown in one example as a gasket in FIG. 2) for sealing the connection between collar 38 and a container. An aperture 88 is in surface 84 for connecting pickup tube or assembly 30, and may be conical for an interference fit, internally threaded or otherwise configured for a secure fit with tube 30. Aperture 88 has an opening 90 that is smaller than a main part of aperture 88 and that communicates with lateral channel 60, forming a conduit with opening 40 that adjoins the container and lateral channel 60. In particular embodiments, a nipple or other connection may be integrally formed with or otherwise connected to base 22 at or through surface 84, with aperture 88 or part of it extending through such connection.

In particular embodiments, an insert 91 may be provided within collar 38, in place of or in addition to threads 82, to contact the bottle or other container when device 20 is connected to it. For example, an insert 91 may be a ring-shaped piece having internal threads compatible with at least one type of bottle or container and external threads, snap surfaces, conical exterior(s), or other features to permit a threaded, snap, interference or other fit within collar 38. As illustrated, insert 91 sits inside of and securely connected to collar 38. In other examples, an insert 91 configured like the child-proof cap on a medicine bottle, allowing easy threading onto a container but requiring downward or inward pressure to remove it from the bottle, may be used. It will also be understood that an insert 91 in another embodiment may be configured to attach externally to (e.g. around or partially around) collar 38. Specific examples of insert 91 are of a plastic, rubber (e.g. hard rubber) or similar material for secure attachment to a bottle or other container. Separate inserts 91 may have different internal diameters, thread configurations or other attributes adapted to accommodate different types of containers. For example, a first insert 91 may be adapted for secure connection to a "growler" (half-gallon jug), while another may be adapted for secure connection to a smaller "bullet" (32-ounce bottle), and other inserts 91 may be adapted for secure connection to other available containers. In that way, a single device 20 may be customized for a variety of containers simply by using the properly-configured insert 91. A set of such inserts 91 may be provided with or as an adjunct to device 20, so that the user can use whichever is appropriate for a particular bottle, then remove it and insert another into collar 38 if he or she chooses a different type of container at another time.

A separate passage 92 is formed through surface 84 lateral of aperture 88, e.g. toward or adjacent to the edge of opening 40, or at least partially overlapping the inward extend of seal 86. Passage 92 extends through body 22 to a side hole 94, in which is fitted a release valve 96. Release valve 96 is a valve that opens when pressure in passage 92 (and thus within a container) reaches a predetermined level, in order to avoid or prevent breakage while maintaining pressure over the beverage. For example, in order to maintain safe operation valve 96 may be a device that opens at a pressure of approximately 25-45 p.s.i. While valve 96 is shown as being fitted in hole 94, as by threading, interference fit or otherwise, it will be understood that valve 96 may be fitted fully outside body 22 or in other fashions for connection to a passage such as passage 92 so as to provide any needed pressure release. In the illustrated embodiment, valve 96 is located substantially beneath gas housing 26 for ease of access and for maintaining valve 96 out of the way of other parts.

A gas conduit 98 also extends from surface 84 through body 22 to lateral channel 60. Conduit 98 is very narrow (e.g. approximately 0.05 inch or less) and is close to or adjacent the edge of opening 40, while laterally separated from passage 92 in the illustrated embodiment (and hence not visible in the cross-section of FIG. 2). A particular example of channel 98 is a straight channel that opens into the portion of lateral channel 60 that holds valve assembly 66, e.g. the distance of channel 98 from opening 61 is approximately the same as the distance of the forward portion of sleeve 70 and/or of flange 76. The narrow size of channel 98 has been found to assist in the proper management of pressure in system 20—a channel of the main diameter of opening 46 can have greater fluctuations and if usable may not produce as desirable a result.

The illustrated embodiment of device 20 has collar 38 of body 20 fitted onto a bottle or other container so that device 20 sits atop and extends upward from the top of the container. In other embodiments, an elbow connection (not shown) may be inserted between the container and collar 38, so that device 20 extends at least slightly laterally from the opening in the container. As a particular example, such an elbow connection may have an angle up to and including 90 degrees. Such a configuration reduces the overall height of the container/device 20 combination, which may be advantageous in storage of the combination and/or access to or usage of device 20.

Piston member 24 is an elongated assembly of two main pieces in the illustrated embodiment, for ease of disassembly and cleaning, although it is to be understood that piston 24 may be a single piece or may be made of less than or more than the number of pieces described below. A first or barrel portion 104 extends into lateral cavity 60 of body 22, and a second or spout portion 106 is fixed to barrel portion 104 and extends out or away from lateral cavity 60. Barrel portion 104 in this embodiment is shaped and sized, as indicated previously, to be slidable and relatively close-fitting within cavity 60, and so is shown in one example to be cylindrical at least in part, with a forward portion 107*a* having vertical flattened sides so as to present a vertical orientation and forward-facing shoulders or cam surfaces 107*b*. Shoulders 107*b* are rounded in the illustrated embodiment, having a central forward point and curving rearward on top and bottom. This configuration provides a substantial mechanical advantage with consistency in applying pressure and gliding contact with a handle, as further discussed below. Such rounded shoulders 107*b* may be part-circular or part-cylindrical in form (e.g. a "half-moon" shape) at least around the central forward point.

Portion 104 extends from body 22 (through opening 61) in this embodiment, with an outer end 108 remaining outside of body 22 and an inner end 109 remaining within lateral channel 60 during operation of system 20. The part of portion 104 within channel 60 includes one or more seals 110 fitted in external grooves around portion 104. The illustrated embodiment includes two seals 110, one to either side of side opening 114. Portion 104 moves longitudinally in channel 60 during use of system 20, so that at different times different amounts of portion 104 are within channel 60, but the forward- or outermost seal 110 should remain within channel 60 during normal operation.

Portion 104 has a channel 112 that is open through end 108 and extends toward end 109, turning in the middle of portion 104 to another opening 114 in the side of portion 104. In a particular example, channel 112 is straight along the central longitudinal axis of portion 104 until it turns, and the turned part is oblique with respect to the central part (e.g. at an angle of 120 degrees). The open end part of channel 112 has a larger diameter to accommodate a part of spout portion 106, and the rest of channel 112 has a smaller uniform diameter in one example. Turned part of channel 112 has an opening in the side of barrel portion 104. A middle gap 116 is also provided in the illustrated embodiment, which is cylindrical and narrower than the central part of channel 112 and is internally threaded. An adjustment member 118 (in the form of a screw in the illustrated embodiment) is within gap 116, to engage valve 68 to open it, and to move away from valve 68 to allow it to close. Screw 118 is threaded into gap 116 in the illustrated embodiment, and has an internal print facing outer end 108 and an oppositely facing engagement surface. The internal print is for insertion of a turning tool (not shown) for moving screw 118 in either direction along gap 116, and so may be one or more slots (e.g. Phillips), lobes (e.g. Torx) or other configurations. In a particular embodiment, screw 118 is for fine adjustment of the amount valve 68 is opened, which affects the amount of gas moving through valve 68 and thereby the degree of foam or head formed on a glass of beer or other beverage. That is, the position of screw 118 with respect to barrel 104 and valve pin 73 affects the amount of foam. A more viscous beer, for example, requires more pressurized gas to form a desired head when poured, but using the same setting for a less viscous beer will provide more foam, which is generally undesirable. Accordingly, screw 118 has a fine thread (for example, a pitch of 1/32 inch) so as to permit very slight adjustments to suit the user's preference regarding foam.

An open cavity 120 is in end 109 of portion 104, and in the illustrated embodiment is larger in diameter than gap 116 and channel 112. Cavity 120 is large enough in diameter to accommodate one end of spring 78, so that spring 78 engages a forward end wall 122 (around gap 116) at one end and flange 76 of valve assembly 66, biasing portion 104 in a direction away from valve assembly 66. As one example, the inner diameter of cavity 120 is approximately the same as the outer diameter of flange 76 and/or the unstressed or normal outer diameter of spring 78. The length and stiffness of spring 78 is chosen so that when fitted between wall 122 and flange 76, the force required to compress spring 78 longitudinally can be applied by hand pressure, e.g. by squeezing handle 130, as discussed herein. In this embodiment, gap 116 communicates with both channel 112 and cavity 120, and so portion 104 is hollow throughout, having an open path (if screw 118 is absent) formed by the central part of channel 112, gap 116 and cavity 120.

Spout portion 106 is a round tube having a linear part with an end 124 fitted into barrel portion 104 and a downturned forward end part ending in a tip 126. A lumen 128 extends from tip 126 to end 124, and in the illustrated embodiment is of a constant diameter that is the same as the diameter of channel 112 through portion 104. End 124 is inserted into the larger-diameter part of channel 112, fitting against the ledge or boss where channel 112 narrows to minimize or eliminate leaks between channel 112 and lumen 128. Spout portion 106 is fixed to barrel portion 104 in any desired manner (e.g. threading, interference fit, welding). For ease of disassembly for cleaning, maintenance or replacement, in the illustrated embodiment spout portion 106 slides into channel 112 and is held there by a set screw 129*a* threaded into a side hole 129*b* in barrel portion 104, locking spout portion 106 with respect to barrel portion 104. In other embodiments, spout portion 106 may be press-fit or threaded into barrel portion 104, or portions 104 and 106 may be monolithic, i.e. formed as a single piece. One or more seals (not shown), e.g. similar to seals 110, may be placed between barrel portion 104 and spout portion 106 (as in grooves in one or both parts, not shown).

Pivotably attached to body 22 is a handle 130. The illustrated embodiment of handle 130 includes a lower segment 132 and an upper segment 134 with an elongated slot 136 that bridges the segments. Lower segment 132 is generally planar and includes a pair of ears 138 with holes for accommodating an axle 140 (e.g. a cotter pin) and an extending boss 142. Boss 142 curves generally toward ears 138 as it extends from the planar part of lower segment 132 opposite to upper segment 134. Upper segment 134 is also generally planar and is bent with respect to lower segment 132, and in a particular example segments 132 and 134 have an included angle between them of 170 degrees. Slot 136 runs along a central axis of segments 132 and 134, having a width W sufficient to allow the flattened forward part 107*a* of barrel portion 104 to pass through. There is a small tolerance between the sides of slot 106 and the flattened sides of barrel portion 104 in the illustrated embodiment so as to limit play between them, yet avoid substantial damage from rubbing between them. The length L of slot 136 is determined to allow handle 130 to pivot with part 107*a* of barrel portion 104 within slot 106, and thus is longer than the vertical form of the forward part of barrel portion 104. In one example, the length of slot 136 is about three times the width of slot 136, e.g. about 1.5 inches in length and about 0.5 inches in width. An aperture 144 extends through body 22 perpendicular to and below lateral channel 60, but above collar 38 in this embodiment. Ears 138 fit on either side of body 22 so that their respective holes align with aperture 144 and axle 140 extends through ears 138 and aperture 144 so that handle 130 is pivotable around axle 140 with respect to body 22. Handle 130 has an outward position limit or idle position (e.g. FIG. 2) where boss 142 engages the outside of collar 38 to stop outward pivoting of handle 130. Adjustment of screw 118 can change the amount of pivoting of handle 130 necessary for a desirable pour of beverage (e.g. amount of foam on the poured beverage).

The inner surface of lower segment 132 engages shoulders 107*b* of piston member 24 on either side of slot 106. Squeezing or otherwise pivoting handle 130 presses handle 130 against shoulders 107*b*. The inventors have found that such rounded shoulders 107*b* permits easier operation, as the mechanical advantage they provide tends to eliminate the need for a higher force to begin pivoting handle 130 with a sudden drop in such force needed when the force of spring 78 is initially overcome. The rounded configuration of shoulders 107*b* in the illustrated embodiment thus provides smooth and consistent movement of piston member 24 with respect to spring 78 and into body 22. In specific embodiments, handle 130 may have a cover or attachment (not shown) for a portion (e.g. part of upper segment 134). Such a cover or attachment may be interchangeable, and may include easy-grip surfaces, particular logos or designs (e.g. beer brands), or other aesthetic or technical features that are desired by the user or make use of handle 130 easier.

Compressed gas housing 26 in the illustrated embodiment includes a tube 150 for connection to body 22 and a cap 152 for attachment to tube 150. In the illustrated embodiment, tube 150 extends upward from body 22, perpendicular to the path and orientation of piston member 24. In other embodiments, an elbow connection (not shown) may be placed between body 22 and tube 150, so that tube 150 extends parallel to the path of piston member 24 (e.g. to the right in FIG. 2) or along a line into or out of the page in FIG. 2, so as to reduce the height of housing 26. A compressed gas cartridge 154 is placed within housing 26 for supplying compressed gas to system 20, and in one example is a commercially available food-grade carbon dioxide cartridge having a substantially cylindrical body that narrows to a neck, with a generally flat end of the neck that can be opened to release the gas. Tube 150 has a cylindrical exterior and a cylindrical interior defining a space 156 in the illustrated embodiment, with a first end 158 for insertion into collar 43 of body 22 and a second opposing end 160 for accepting cap 152. End 158 may be thought of as a male end, with a reduced outer diameter that fits firmly or snugly within collar 43, as with a threaded connection or other secure fit. A groove around an upper portion of end 158 is provided in this embodiment for a seal 162 (e.g. an O-ring). End 160 may be thought of as a female end, with an opening or space that communicates with space 158 and allows insertion of at least a portion of cap 152. End 160 has a first larger inner diameter bordered by a ledge or boss 164, and a second smaller inner diameter that leads into space 158, which in this embodiment has a smaller inner diameter than the second inner diameter of end 160. A groove 166 is provided as a thread relief, and is above a beveled surface 168 that leads into space 158, for ease of loading cartridge 154.

Cap 152 in the illustrated embodiment has an upper portion 170 with an outer diameter the same as the outer diameter of the cylindrical exterior of tube 150, and a lower portion 172 that fits with the surfaces of end 160 of tube 150, e.g. with a threaded or otherwise secure fit. As seen in the drawings, lower portion 172 of an embodiment of cap 152 has two generally cylindrical outer surfaces separated by a ledge or boss 173 that engages boss 164 when those outer surfaces are engaging the inner surfaces of end 160 of tube 150. One or both of those outer surfaces may include a groove for a seal 174 (e.g. an O-ring). In the illustrated embodiment, cap 152 has an inner hollow or cavity 176 that is wide at a mouth 176*a* or internal end of cap 152 and narrows (e.g. with a convex curve and/or conical surface) to a narrow cylindrical internal portion **176*b*. In particular embodiments, the diameter of portion 176*b* is the same as or slightly larger than the diameter of the neck of cartridge 154, to limit or eliminate movement between cartridge 154 and cap 152. Extending from portion 176*b* toward the outer end of cap 152 is an aperture 178 for a pierce pin 180. Pierce pin 180 in this embodiment includes a body securely fixed within aperture 178, as by interference fit, welding, threading (e.g. left-hand threading) or other methods, a flange to engage the end surface of portion 176*b* of hollow 176, and a pointed or otherwise sharp end 182 that extends into portion 176*b*. End 182 has an end hole 184 communicating with one or more side holes 186 to ensure clear flow and direct gas as it exits cartridge 154**.

When tube 150 is fixed to body 22 (e.g. threaded or otherwise fitted into collar 43), a cartridge 154 can be loaded into inner space 158 of tube 150 with its cylindrical body in end 158 (e.g. against body 22) and its neck extending upward into end 160 of tube 150. Placement of cartridge as noted, with its neck pointing upward, provides advantages including ease of access to pierce pin 180, ease of insuring that the cartridge 154 is pierced appropriately, and providing a relatively large space between the neck and the exit for the gas to flow. Cap 152 is fitted onto end 160 (e.g. by threading or pressing), and as cap 152 moves downward to seat against or approach boss 164 of end 160, sharp end 182 of pin 180 engages and pierces the end of the neck of cartridge 154. Compressed gas is released from cartridge 154 into hollow 176 via holes 184, 186 and is directed by the surfaces of hollow 176 into space 158. As noted previously, housing 26 is sealed, and therefore the compressed gas is conducted into and through body 22, as will be discussed further below.

Pickup tube or assembly 30 in this embodiment includes a connector 190 (e.g. a hose barb or other tube or fitting) and an elongated tube 192. Connector 190 has an upper cylindrical or slightly conical fitting 194 sized and configured for an interference, threaded or other fluid-tight fit with body 22 in aperture 88. A flange 196 extends outward from or is a part of fitting 194, and extending from flange 196 in the illustrated embodiment is a barbed or ridged extension 198. In other embodiments, extension 198 may be smooth, to provide a slip-on interference fit with tube 192. Such a connector 190 may be an example of the "nipple" or other connection noted above. A lumen 200 passes through extension 198, flange 196 and fitting 194 and is open at both ends. In the illustrated embodiment, lumen 200 has a first smaller diameter in extension 198 and a larger diameter in fitting 194. A check valve (not shown) may be placed in the connector 190 or tube 192, for opening at a predetermined pressure (e.g. at least 7 p.s.i.).

Tube 192 is for extending into the beverage within the bottle or other container and thus is of an easily cleanable material suitable for allowing beverage to pass through its lumen 202. In the illustrated embodiment, tube 192 is flexible (e.g. of a flexible plastic or similar material), and is placed over extension 198 so that the barbs or ridges of extension 198 grip the inner diameter of tube 192. In other embodiments, tube 192 may be of a suitable rigid material (e.g. stainless steel, hard plastic or similar material). Tube 192 is sized in length so that it extends from connector 190 to or adjacent to the bottom of the container to which system 20 is attached, so that most or substantially all of the contents of the container can be dispensed via system 20. In some embodiments, a filter or mesh screen (not shown) may be placed over or within the intake end of tube 192 (which is within the beverage and opposite connector 190). Such a filter can block or impede sediment from the liquid from traveling along lumen 202. Some types of craft beers include a significant amount of solid particles from the brewing process, and including a filter as indicated prevents such items from being dispensed or from fouling system 20. The intake end of tube 192 may be beveled or irregularly cut (e.g. notched or arched) in particular embodiments to provide better flow characteristics. The inventors have found that a lower end of tube 192 that is cut perpendicularly to the longitudinal axis of tube 192, particularly one in which the end is very close to the bottom of the bottle, can result in a failure to draw sufficient liquid (analogous to a vapor-lock condition in an engine). It will be understood that in particular embodiments the user may trim, adjust or reconfigure the shape of tube 192 or its end as may be necessary or desirable.

Figure 2:
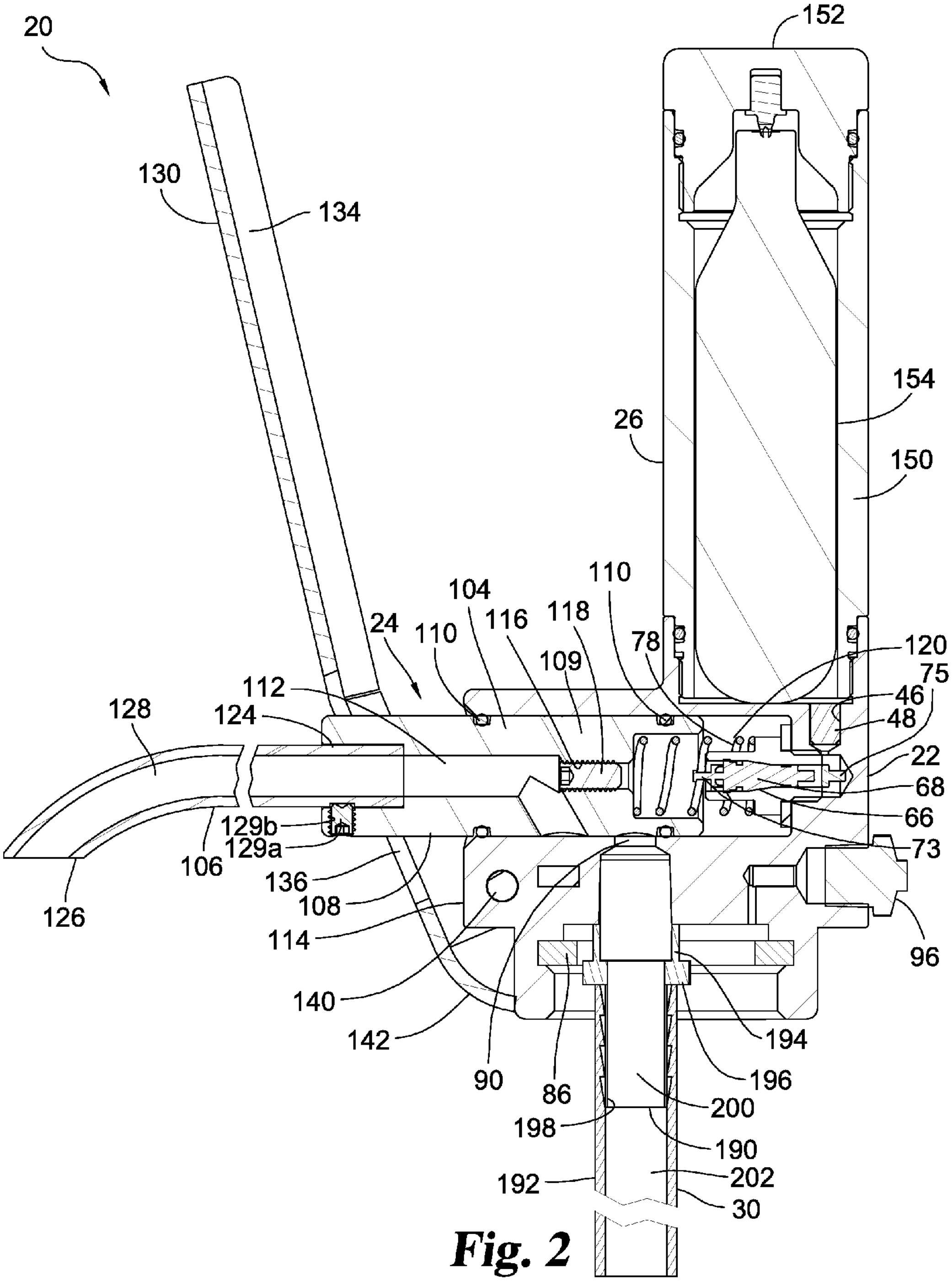
FIG. 2 is a cross-sectional view of the embodiment of FIG. 1, taken along the lines II-II in FIG. 1 and viewed in the direction of the arrows.
Figure 3:
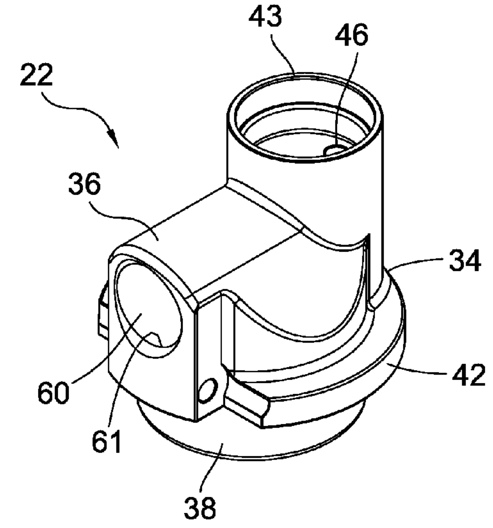
FIG. 3 is a perspective view of a portion of the embodiment of FIG. 1.
Figure 4:
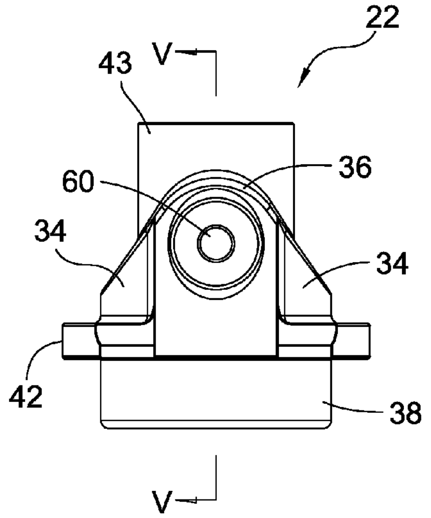
FIG. 4 is a front view of the portion shown in FIG. 3.
Figure 5:
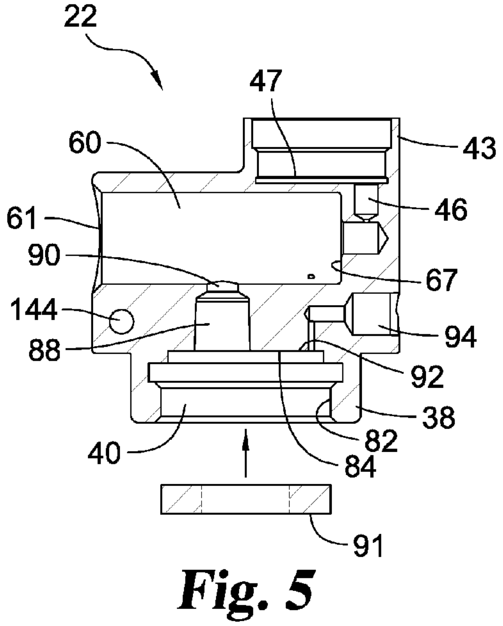
FIG. 5 is a cross-sectional view of the portion shown in FIG. 4, taken along the lines V-V in FIG. 4 and viewed in the direction of the arrows.
Figure 6:
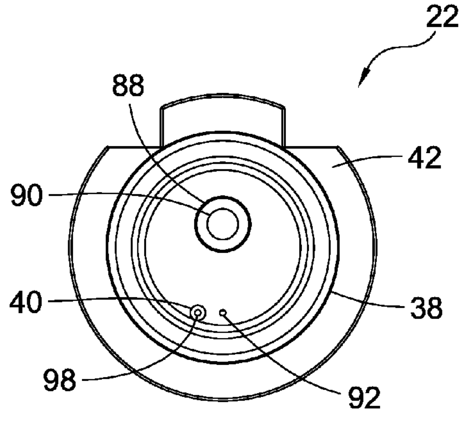
FIG. 6 is a bottom view of the portion shown in FIG. 3.
Figure 7:
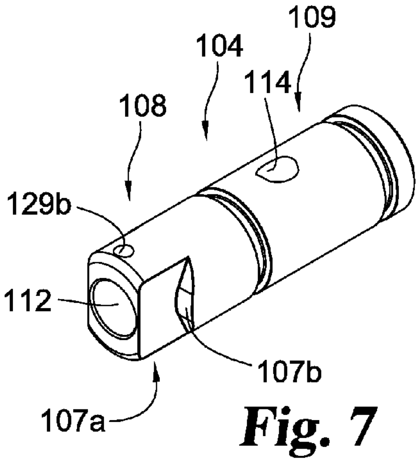
FIG. 7 is a perspective view of a portion of the embodiment of FIG. 1.
Figure 8:
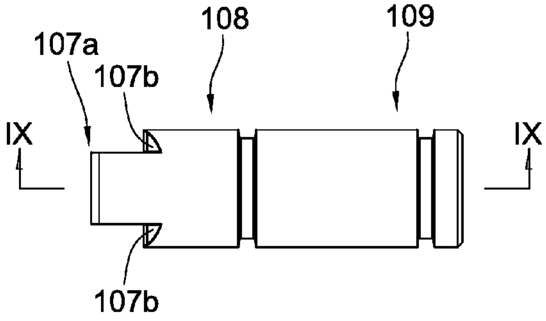
FIG. 8 is a side view of the portion shown in FIG. 7.
Figure 9:
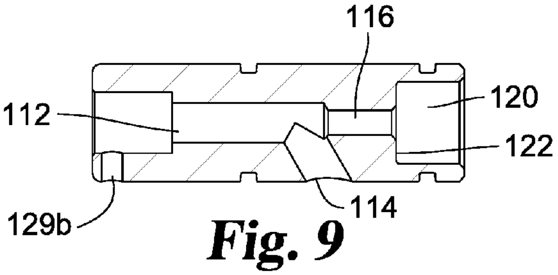
FIG. 9 is a cross-sectional view of the portion shown in FIG. 8, taken along the lines IX-IX in FIG. 8 and viewed in the direction of the arrows.
Figure 10:
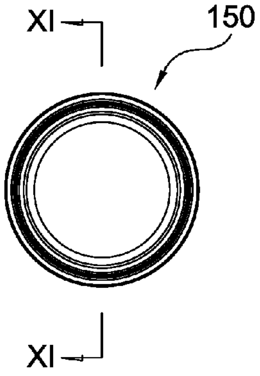
FIG. 10 is an end view of a portion of the embodiment of FIG. 1.
Figure 11:
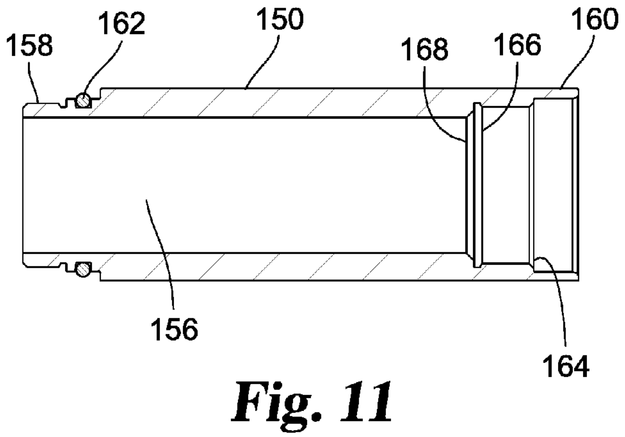
FIG. 11 is a cross-sectional view of the portion shown in FIG. 10, taken along the lines XI-XI in FIG. 10 and viewed in the direction of the arrows.
Figure 12:
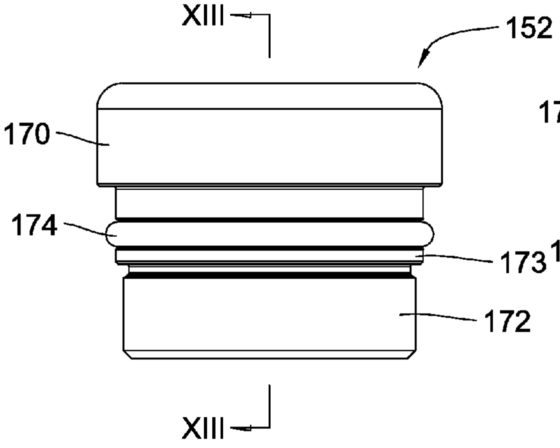
FIG. 12 is a side view of a portion of the embodiment of FIG. 1.
Figure 13:
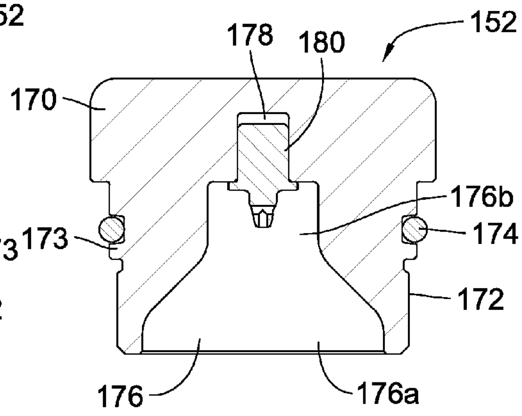
FIG. 13 is a cross-sectional view of the portion shown in FIG. 12, taken along the lines XIII-XIII in FIG. 12 and viewed in the direction of the arrows.
Figure 14:
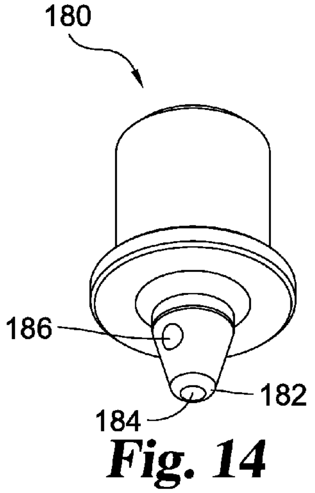
FIG. 14 is a perspective view of a portion of the embodiment of FIG. 1.
Figure 15:
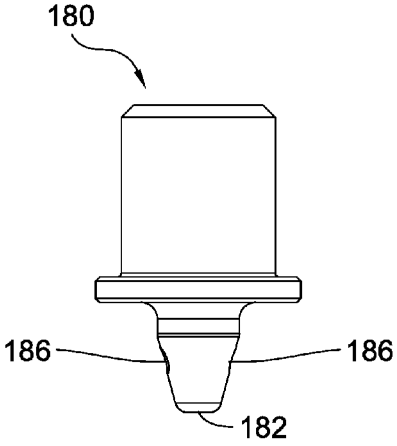
FIG. 15 is a side view of the portion shown in FIG. 14.
Figure 16:
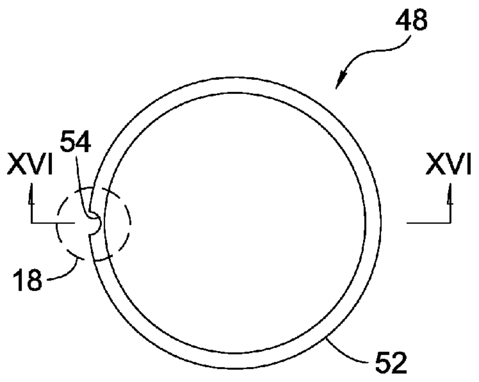
FIG. 16 is a top view of a portion of the embodiment of FIG. 1.
Figure 17:
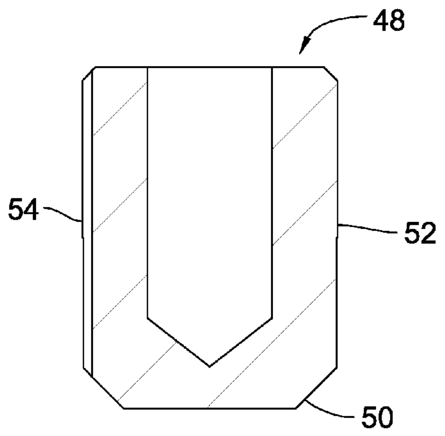
FIG. 17 is a cross-sectional view of the portion shown in FIG. 16, taken along the lines XVII-XVII in FIG. 16 and viewed in the direction of the arrows.
Figure 18:
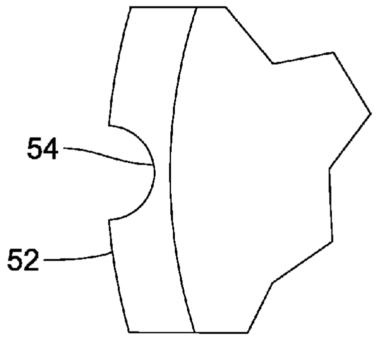
FIG. 18 is a detail of a part of the portion shown in FIG. 16, indicated by the circle in FIG. 16.
Figure 19:
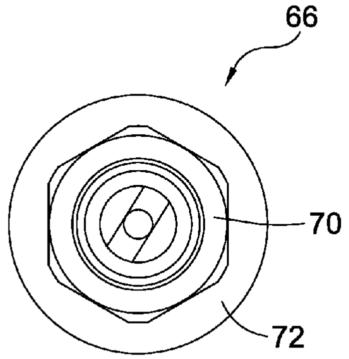
FIG. 19 is an end view of a portion of the embodiment shown in FIG. 1.
Figure 20:
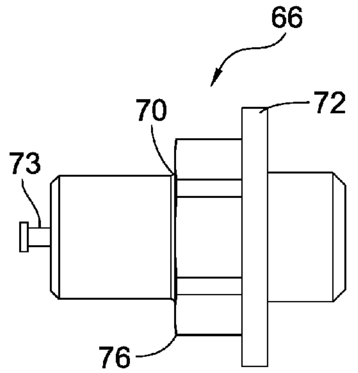
FIG. 20 is a side view of the portion shown in FIG. 19.
Figure 21:
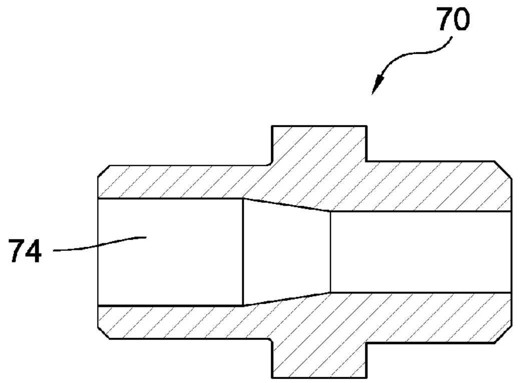
FIG. 21 is a cross-sectional view of a part of the portion shown in FIGS. 19-20.
Figure 22:
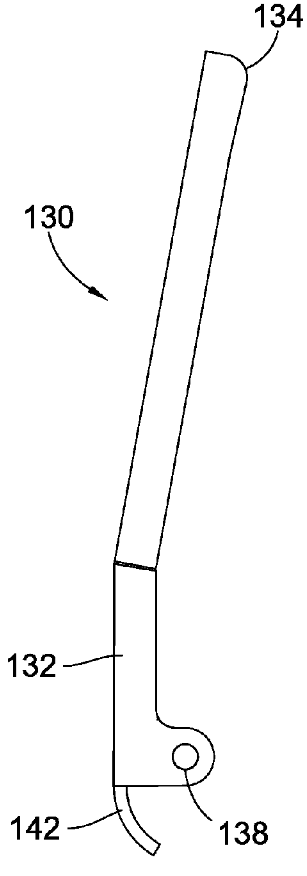
FIG. 22 is a perspective view of a portion of the embodiment shown in FIG. 1.
Figure 23:
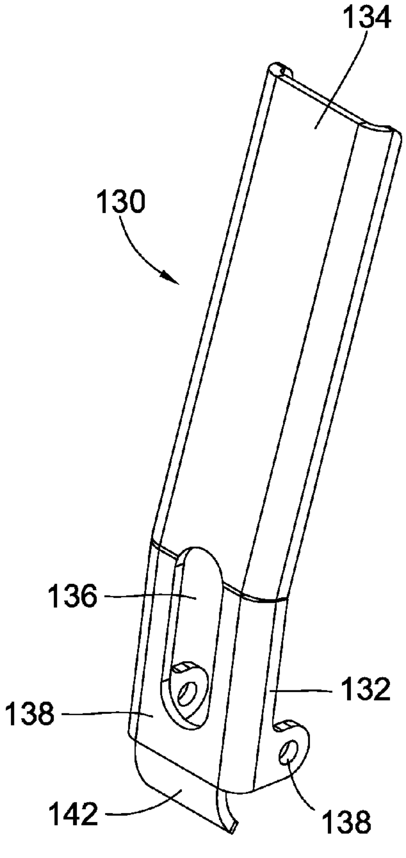
FIG. 23 is a side view of the portion shown in FIG. 22.

An exemplary description of the use of system 20 will now be made with reference to the embodiments shown in the drawings, and with reference to a container (e.g. growler) as indicated. Unless otherwise stated, the discussion below assumes that the parts of system 20 described above are already in their relationships as shown in FIGS. 1-2, e.g. they have been assembled for use as system 20. It will be understood that such uses may be made with somewhat different embodiments, and that other usages may be made of the illustrated embodiments as well.

Once the container is opened, as by removing a cap from a threaded opening, body 22 is threaded onto the opening. The threads 74 within collar 38 engage threads of the container, until firm engagement between body 22 and the container is achieved. In the illustrated embodiment, body 22 is threaded onto the container until seal 86 engages the container (e.g. an upper surface of a neck) to create a seal between them. If not done prior to connecting body 22 to the container, a compressed gas cartridge 154 is inserted into tube 150 of housing 26 and cap 152 is fitted on tube 150 as described above. Pierce pin 180 is forced into cartridge 154, and gas from within cartridge 154 fills hollow 176 and space 158, and is forced through opening 46 and through groove 54 of restrictor plug 48. From opening 46 gas enters the rearward portion of lateral channel 60 to valve assembly 66. With valve 68 closed, gas cannot move beyond assembly 66, but when valve 68 is opened (by screw 118 engaging and pushing pin 73), gas moves through valve 68 and into the area outside assembly 66 including cavity 120 at the end of barrel portion 104 of piston member 24. Gas then moves through narrow conduit 98 to opening 40 and thereby communicates with the inside of the container. System 20 thus provides a closed path for gas from cartridge 154 to the container, with multiple restriction points in the illustrated embodiment: a narrow outlet from the gas source (i.e. groove 54 of restrictor plug 48 and its hole, valve 68, and narrow conduit 98. These restriction points provide for consistent controlled flow of gas and a quite consistent dispensing operation of system 20.

Once system 20 is connected to a container and gas from cartridge 154 is available, the user may use system 20 to charge the container with gas and/or to pour a measure of the beverage. As previously noted, system 20 has an unstressed or idle condition in which handle 130 and piston 24 are positioned as indicated in FIGS. 1-2, with handle 130 generally away from body 22 and piston 24 pushed outward (to the left as seen in FIG. 2) under the bias of spring 78. Boss 142 of handle 130 engages body 22 as the counterforce to spring 78 to maintain handle 130 and piston 24 stationary. In that idle position, screw 118 in barrel portion 104 of piston 24 does not engage pin 73 of valve 68, and therefore gas does not flow through valve 68. Also, in that idle position the turned or side-directed part of channel 112 of piston 24 is offset from opening 90 of body 22, so that liquid cannot pass from lumen 200 into channel 112, but instead is blocked by the side of barrel portion 104.

In a preferred embodiment, handle 130 in the noted idle position is less than a hand-width away from housing 26, so that a user can operate system 20 to dispense beverage with one hand. The user places the gap between a thumb and forefinger around housing 26 and extends his or her fingers to and around upper segment 134 of handle 130. With the hand braced around housing 26, squeezing with the fingers pivots handle 130 around axle 140. When that squeezing pressure is released or reduced, the bias of spring 78 forces piston 24 outward, which pivots handle 130 to return to the idle position.

When the user pivots handle 130 from the idle position toward housing 26, handle 130 presses against shoulders 107*b* of barrel portion 104 and forces barrel portion 104 into body 22 (and spout portion 106 toward body 22) against the bias of spring 78. When piston 24 moves far enough along channel 60 into body 22, the side-opening part of channel 112 partially or wholly overlaps with opening 90 in body 22. A flow path is opened for the beverage from the container through lumen 200, 202 of pickup 30 and channel 112 and out of tip 126 of spout portion 106. Screw 118 in piston 24 engages pin 73 of valve 68 prior to and/or at the same time that such beverage flow path opens, so that gas can move through valve 68. Pressure is thus applied and maintained in the container via the gas flow path noted above, with gas forcing beverage along the liquid flow path and covering the beverage to prevent or limit oxygen approaching the beverage. In specific embodiments, when piston 24 is as far inside body 22 as handle 130 and/or spring 78 will permit, then the side-directed part of channel 112 and opening 90 fully overlap to make a fully open flow path, and valve 68 will be open.

The heavier-than-air gas (e.g. carbon dioxide) covers the beverage, limiting or eliminating exposure to air, and creates or contributes to head pressure over the beverage which forces beverage into tube 192. The beverage moves up tube 192, and if a check valve is present, it passes through the check valve when the pressure on the beverage (or gas preceding the beverage) exceeds the amount of pressure needed to open the check valve. The beverage moves through lumen 200, 202 and opening 90 into channel 112, and out of spout tip 126 into the user's glass. When the desired amount of beverage has been dispensed, the user at least partially releases handle 130. The bias of spring 78 moves piston 24 outward, which pivots handle 130 away from housing 26 until handle 130 pivots sufficiently for boss 142 to engage body 22 (e.g. at collar 38), to reach the idle position. Such movement moves screw 118 away from valve assembly 66, eventually disengaging pin 73 and closing valve 68. The beverage flow path is closed by offsetting channel 112 from opening 90, as is the separate gas flow path by allowing valve 68 to close. If a check valve is present, it will close as the pressure falls below the amount required to open it, limiting or preventing any further passage of beverage.

As noted above, release valve 92 is provided to relieve pressure within the container if it approaches a level that may cause damage. In such a case, valve 92 opens, allowing gas to escape from the bottle via channel 90 and valve 92. Such a condition should occur infrequently or under abnormal conditions, since gas only moves through valve 68 when valve 68 has been opened by the movement of piston 24 into body 24, generally for the purpose of dispensing beverage.

As dispensing occurs, the liquid level in the container is reduced, leaving greater volume for gas.

The parts of device 20 are preferably of sturdy materials compatible with use in food-service contexts, and in particular embodiments aluminum, stainless steel, hard plastics, or a combination of these or other appropriate materials (e.g. materials acceptable under FDA regulations concerning food- or beverage-service devices). Preferable materials would also include those that are easily washable and/or sterilizable. It will be understood that the threaded connections among a number of the parts of device 20 can enable easy disassembly of such parts in certain embodiments for cleaning. In particular embodiments, most or all connections between parts may be threaded in order to permit quick and easy removal or disassembly, providing a significant advantage in terms of cleaning or replacement of parts, which may be difficult or impossible with existing dispensing systems. For example, piston assembly 24, housing 26 and pickup assembly 30 may be unscrewed or otherwise disengaged from body 22 for cleaning, repair or replacement. As another example, barrel portion 104 and spout portion 106 may be disengaged from each other (as by loosening or removal of set screw 129*b*), or valve assembly 66 may be removed from body 22, for cleaning, repair or replacement. Such disassembly or disengagement of parts is non-destructive, so that the user can re-assemble them (or use replacement parts) to continue use of the device. Seals noted above can be of known form, and in particular embodiments may be of configurations or materials that reduce friction among parts of device 20.

It will be understood that features identified with a particular embodiment of a structure could be used with or in other embodiments or other structures as well. For example, tube 150 of housing 26 may be integral with body 22 in particular examples. Further, while the above discussion primarily concerns use of the disclosed structures to dispense beverages, it will be understood that use of such structures to dispense other fluids or substances is also contemplated.

While the subject matter herein has been illustrated and described in detail in the exemplary drawings and foregoing description, the same is to be considered as illustrative and not restrictive in character, it being understood that only the preferred embodiment(s) have been shown and described and that all changes and modifications that come within the spirit of the disclosure are desired to be protected. It will be understood that structures, methods or other features described particularly with one embodiment can be similarly used or incorporated in or with respect to other embodiments.

What is claimed is:

1. A dispenser apparatus for attachment to a beverage container having an interior for containing a beverage, comprising:

a base having an opening for communicating with the interior of the beverage container when attached to the beverage container, and a lateral channel;

a piston member slidably within the lateral channel, the piston member having a spout portion outside of the channel and moveable with the piston member, and a conduit extending through a wall of the piston member and out of the spout portion whereby beverage from within the container may pass through the conduit and exit from the spout portion;

a handle pivotally attached to the base, the handle connected to the piston member so that as the handle is pivoted toward the base, the piston member is forced through the lateral channel of the base;

a compressed gas housing attached to the base, the housing including an inner cavity;

wherein a flow path extends from the cavity of the compressed gas housing through the base to the opening, the flow path having multiple constricting points, including a first constricting point including a chamber having a restrictor plug at least partially in the chamber, and a second constricting point including a valve.

2. The apparatus of claim 1, wherein the flow path includes a third constricting point including a conduit from the lateral channel to the opening, the conduit being narrower than the chamber of the first constricting point.

3. The apparatus of claim 1, wherein the lateral channel is non-parallel with the restrictor plug.

4. The apparatus of claim 1, wherein the piston member includes an end opposite the spout portion with an end opening facing the valve, and a spring engaging the piston member within the end opening and engaging a sleeve holding the valve.

5. The apparatus of claim 4, wherein the piston member includes a threaded gap communicating with the end opening and the valve includes a pin biased to a closed position, and further including a screw threaded in the gap, the screw contacting the pin at a point when the handle is pivoted a predetermined amount toward the base, whereby the screw moves the pin to open the valve.

6. The apparatus of claim 1, wherein the apparatus has a first idle configuration and a second dispensing configuration, and in the first configuration the handle is positioned with respect to the compressed gas housing so that an adult can grasp the compressed gas housing and the handle at the same time with a single hand.

7. The apparatus of claim 6, wherein the second configuration is attained by pivoting the handle toward the compressed gas housing.

8. The apparatus of claim 1, wherein the compressed gas housing includes a compressed gas tube having an outlet and a cap, and wherein in operation the outlet of the compressed gas tube faces the cap.

9. The apparatus of claim 1, further comprising a feed tube removably fixed to the base and extending through the opening to extend into the beverage container.

10. A system for dispensing beverage under pressure from a container, comprising:

a base for attachment to the container, the base having a gas flow path including a valve;

a piston member slidably within the base, having a spout portion extending away from the base and moveable with the piston member, and a fluid flow channel;

a handle pivotally attached to the base, wherein the handle can engage the piston member to move the piston member into the base and toward the valve;

a compressed gas housing attached to the base; and a pickup assembly extending from the body and for extending into the container, wherein moving the piston member into the base a desired amount causes a portion of the piston member to engage a portion of the valve to open the valve and allow gas to move through the valve.

11. The system of claim 10, wherein the gas flow path comprises a narrow outlet between the compressed gas housing and the valve forming a first constricting point, and wherein the valve is a second constricting point in the gas flow path.

12. The system of claim 11, further comprising a plug having a longitudinal groove engaged in the base, the longitudinal groove forming at least part of the narrow outlet.

13. A dispenser apparatus for attachment to a beverage container having an interior for containing a beverage, comprising:

a base having an opening for communicating with the interior of the beverage container when attached to the beverage container and a lateral channel spaced from the opening;

a valve attached to the base within the lateral channel and along a gas flow path through the base;

a piston having a spout portion, moveable with the piston the piston being at least partially within the lateral channel and the spout portion having a tip outside of the lateral channel, and the piston being movable along the lateral channel toward and away from the valve, wherein the gas flow path extends from an upper cavity in the base for accommodating a gas source to the opening, the gas flow path having a plurality of constricting points, including a first constricting point including a narrow outlet between the upper cavity and the valve, and wherein the valve is a second constricting point.

14. The apparatus of claim 13, further comprising a plug having a longitudinal groove engaged in the base, the longitudinal groove forming at least part of the narrow outlet.

15. A dispenser apparatus for attachment to a beverage container having an interior for containing a beverage, comprising:

a base having an opening for communicating with the interior of the beverage container when attached to the beverage container, and a channel;

a piston member slidably within the channel, the piston member having a spout portion outside of the channel and moveable with the piston member, and a conduit extending through a wall of the piston member and out of the spout portion whereby beverage from within the container may pass through the conduit and exit from the spout portion, the piston member including an end opposite the spout portion with an end opening facing the valve, and a spring engaging the piston member within the end opening;

a handle pivotally attached to the base, the handle connected to the piston member so that as the handle is pivoted toward the base, the piston member is forced through the channel of the base; and a compressed gas housing attached to the base, the housing including an inner cavity.

16. The apparatus of claim 15, wherein the piston member includes a threaded gap communicating with the end opening and the valve includes a pin biased to a closed position, and further including a screw threaded in the gap, the screw contacting the pin at a point when the handle is pivoted a predetermined amount toward the base, whereby the screw moves the pin to open the valve.

17. The apparatus of claim 15, wherein the spring also engages a sleeve holding the valve.

18. The apparatus of claim 13, further comprising a handle for moving the piston toward the valve, the handle having an outer surface facing away from the body and including a slot through which a part of the piston extends beyond the outer surface.

19. The apparatus of claim 13, wherein the piston includes at least one rounded shoulder facing the handle to the side of the spout portion, and wherein the handle engages the at least one rounded shoulder portion so as to move the piston toward the valve.

20. The apparatus of claim 1, wherein the compressed gas housing includes a tube having first and second ends and a cap, the tube connected to the body at the first tube end and to the cap at the second tube end opposite the body, the cap having a pierce pin.

* * * * *